April 1, 1941. R. H. ZINKIL ET AL 2,236,884
SINK STRAINER AND STOPPER AND THE LIKE
Filed June 17, 1938 6 Sheets-Sheet 1
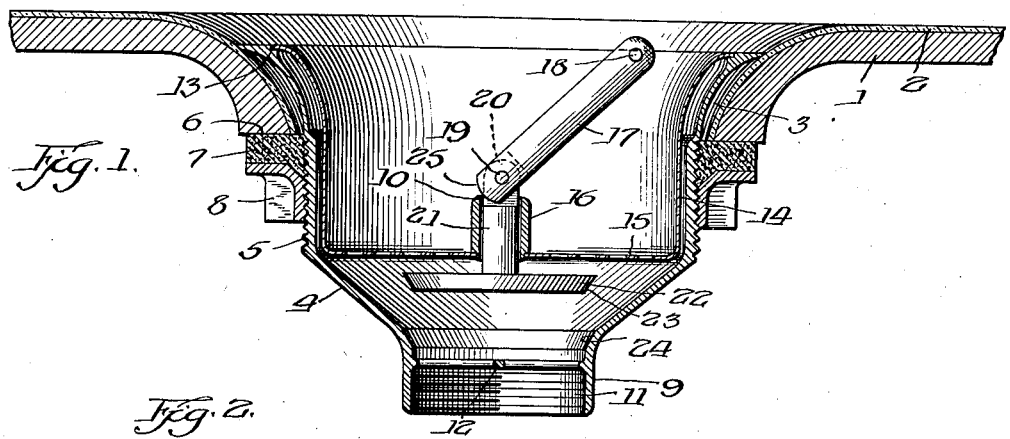
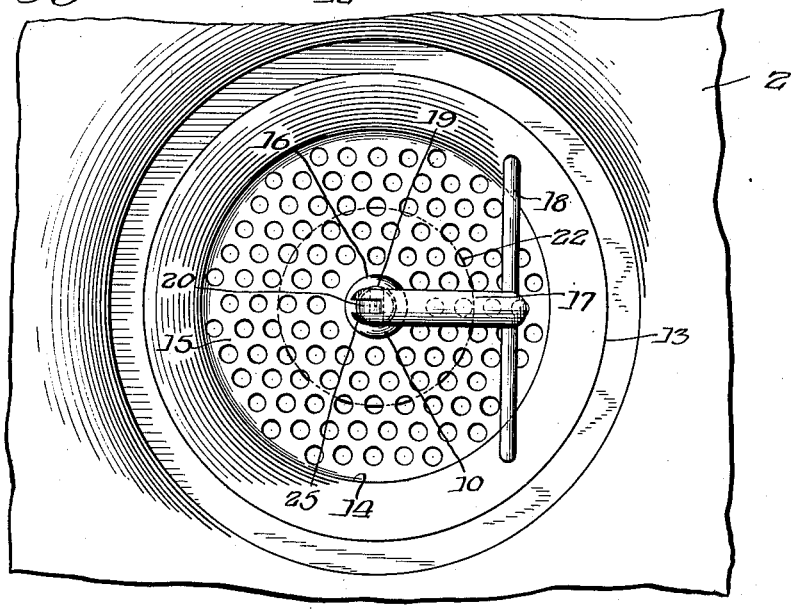
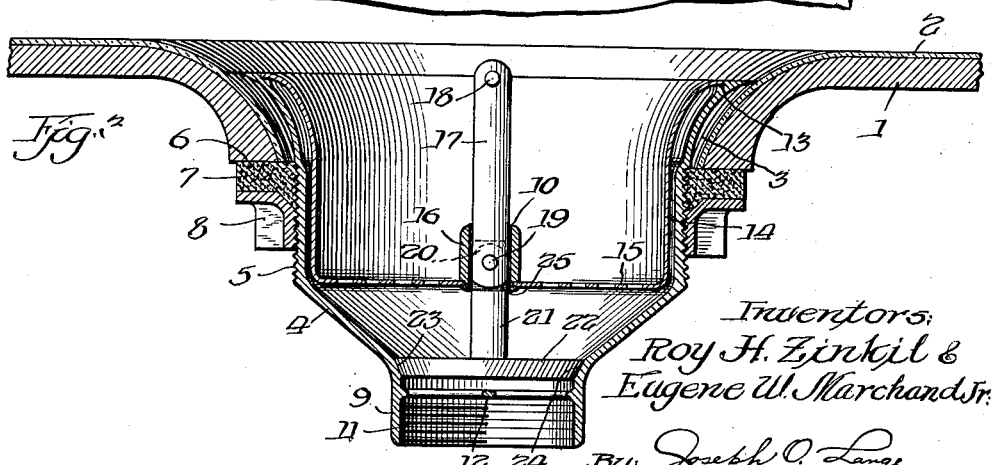
Inventors:
Roy H. Zinkil &
Eugene W. Marchand Jr.
By: Joseph O. Lange Atty

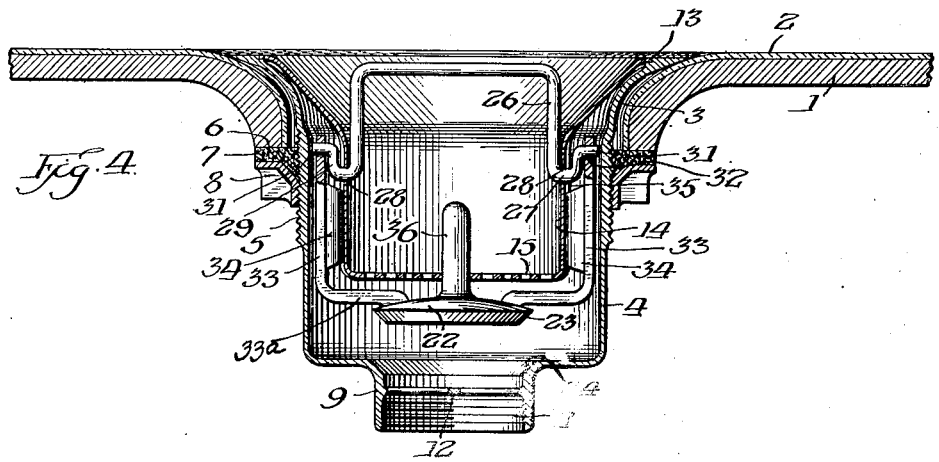
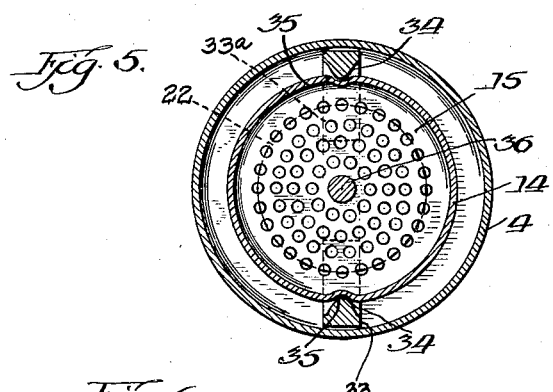
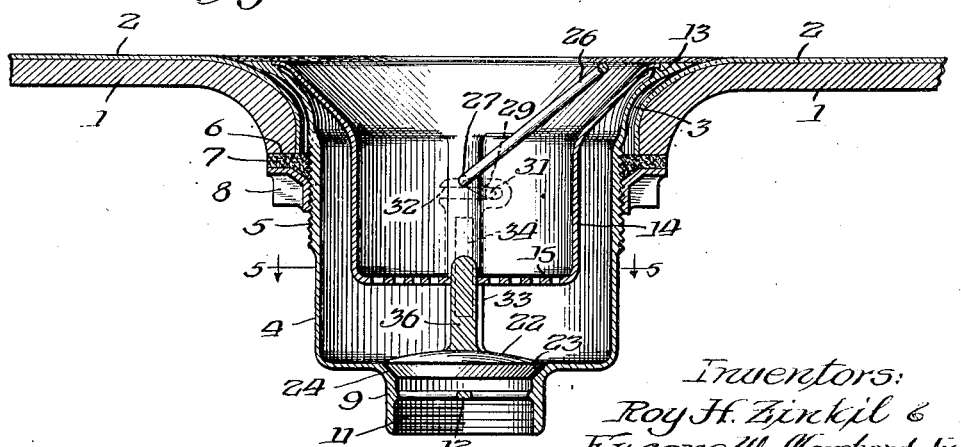

Inventors:
Roy H. Zinkil &
Eugene W. Marchand Jr.
By: Joseph O. Lange Atty.

April 1, 1941. R. H. ZINKIL ET AL 2,236,884
SINK STRAINER AND STOPPER AND THE LIKE
Filed June 17, 1938  6 Sheets-Sheet 4

Inventors:
Roy H. Zinkil &
Eugene W. Marchand Jr.
By Joseph O. Lange Atty.

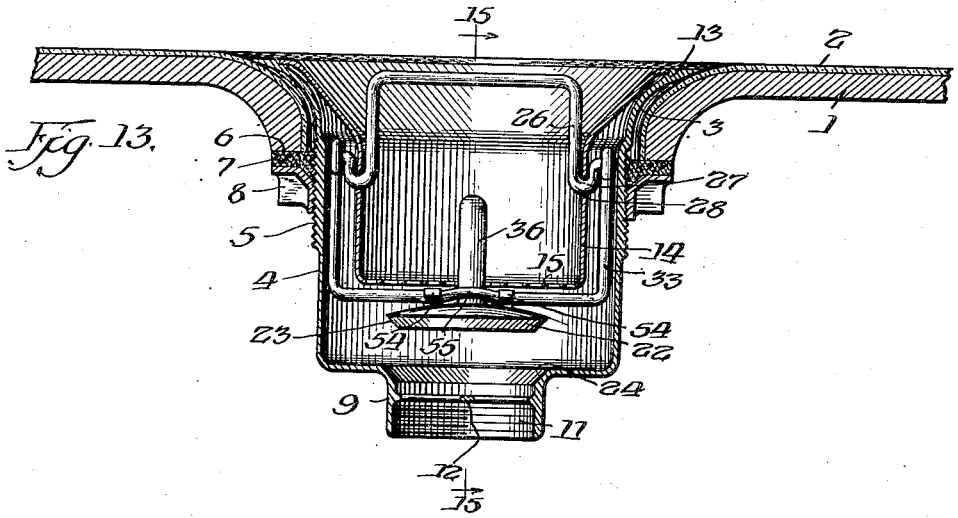
Fig. 13.
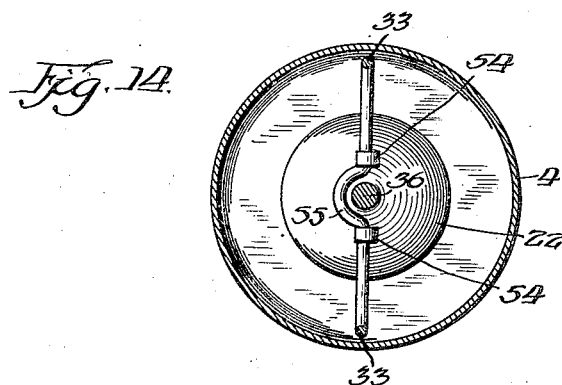
Fig. 14.
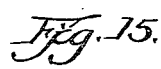
Fig. 15.
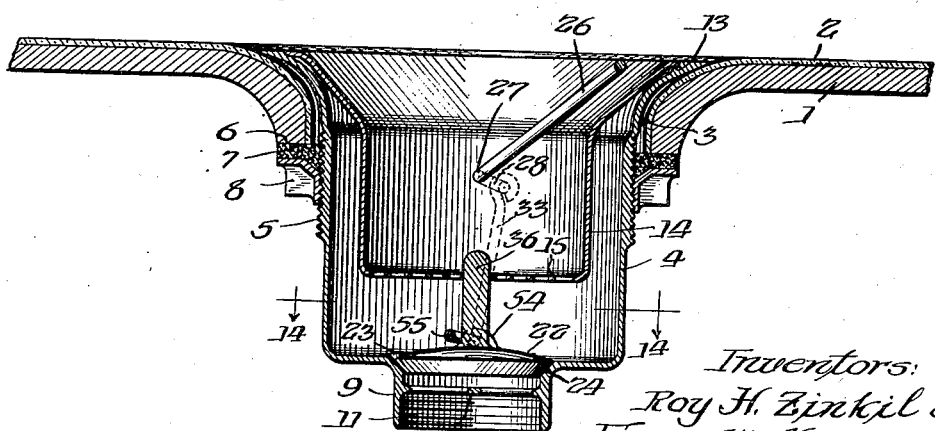
Inventors:
Roy H. Zinkil &
Eugene W. Marchand Jr.
By: Joseph O. Lange Atty.

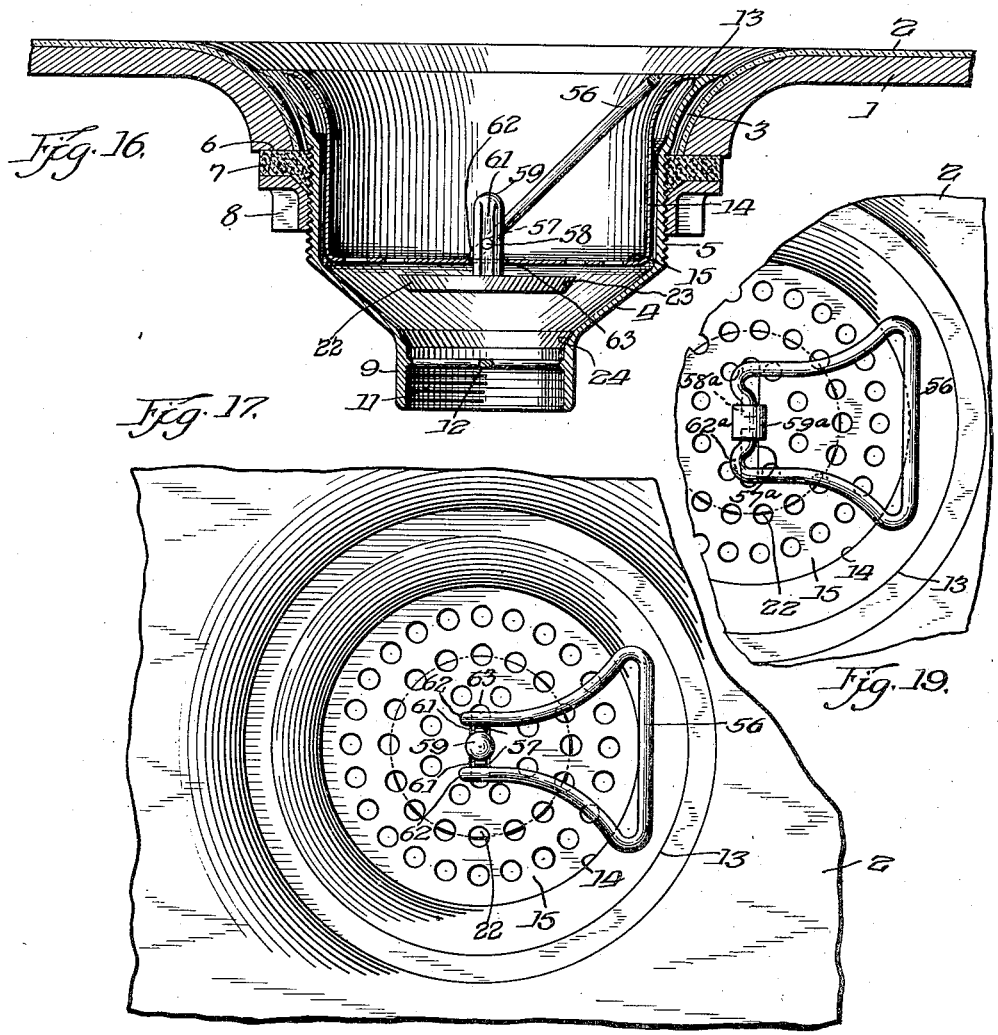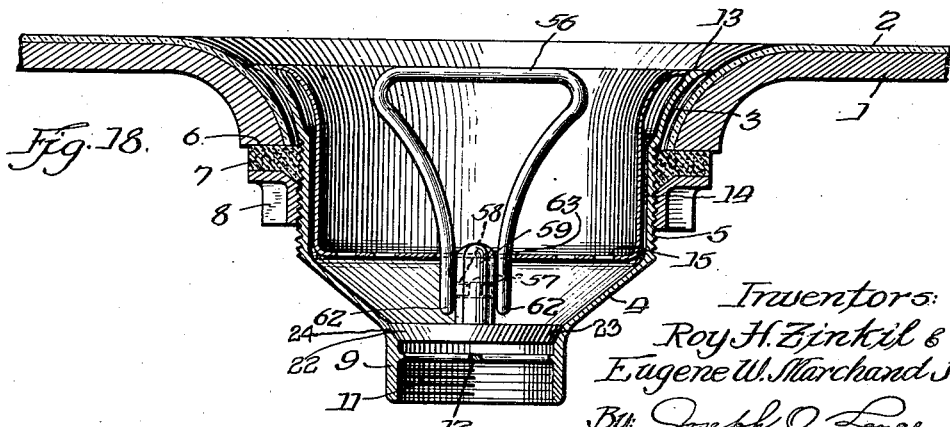

Patented Apr. 1, 1941

2,236,884

UNITED STATES PATENT OFFICE 2,236,884

SINK STRAINER AND STOPPER AND THE LIKE

Roy H. Zinkil, Oak Park, and Eugene W. Marchand, Jr., Maywood, Ill., assignors to Crane Co., Chicago, Ill., a corporation of Illinois Application June 17, 1938, Serial No. 214,200

6 Claims. (Cl. 4—287)

More particularly, our invention relates to a more simple and economical sink strainer and stopper combination than heretofore available for the purpose set forth, in which the latter member is preferably embodied in basket or tubular form with one end perforated for straining purposes and in which a suitable plug or stopper member carried by the strainer or basket is reciprocably movable therewithin so as to serve as a valve shut-off enabling the filling of the basin of the sink with water, if desired.

Sink strainers of a previous type have been available in which the valve has been removable as an integral part of the strainer and in which the stopper member mounted in the strainer has been reciprocably movable upon similar movement by the handle, but to our knowledge no one has employed a construction in which upon pivotal movement of the stopper handle the latter is so actuated to be positioned close to the top or rim of the basket strainer whether the valve is in open or closed position, thus clearly avoiding the usual deposits within the strainer.

Another important advantage lies in providing toggle action whereby the plug or closure member may be suitably locked.

Another advantage lies in providing a T handle form of construction in which the latter may be actuated with great convenience.

A further object lies in providing for a strainer and a valve closure member in which the latter member may be removed either individually for ready replacement or inspection or while assembled with the basket strainer, the removability being facilitated by the disengagement of the valve handle allowing for the strainer to be lifted without disturbing the positioning of the valve proper.

Another object of the invention is to provide for a relatively economical construction in which a wire bail member may be used on the plug or closure member to lock the latter in a vertical position, and further to provide a simple rim punching construction in this combination.

Another advantage lies in providing for a snap-in type of bail member provided on the strainer, and a further modified form may be provided with a slot and crank mechanism fulcruming on the centerpiece or the strainer.

Another object lies in providing for a construction in which a bail member may be used to fulcrum in the side walls of the strainer and having crank arms projecting therefrom engaging a wire or cast slotted member attached integrally or separately to the valve closure member or stopper.

Another object lies in providing for a construction in which the closure member or stopper may have a centering stub or post indicating the position of the valve stopper.

Other advantages of the construction will become more readily apparent in connection with a review of the patent drawings as described in the following figures.

Fig. 1 is a sectional assembly view of an embodiment of our invention showing a type of construction in which a toggle mounted lever handle is used to lock or hold the plug or closure member in an open position upon the strainer.

Fig. 2 is a fragmentary plan view of the same construction.

Fig. 3 is a view similar to Fig. 1 except that the plug or stopper is shown in the closed position.

Fig. 4 is a view of a modified form of the construction in which a crank and slotted arrangement is journally mounted within the strainer in order to actuate the valve member therefor.

Fig. 5 is a sectional view taken on the line 5—5 of Fig. 6.

Fig. 6 is a sectional view similar to that shown in Fig. 4 except that it is taken at right angles to the latter figure and in which the stopper or closure member is shown in the seated position.

Fig. 13 is a sectional assembly view showing a still further modified form of our construction in which a wire bail member is used with a crank offset locking the plug or stopper in the open position.

Fig. 14 is a sectional view taken on the line 14—14 of Fig. 15.

Fig. 15 is a sectional assembly view taken on the line 15—15 of Fig. 13.

Fig. 16 is a sectional view of another modified form of the construction in which a snap-in type wire bail member is used on the stopper.

Fig. 17 is a plan view of the construction described in connection with Fig. 16.

Fig. 18 is a sectional view similar to that shown in Fig. 16 except that it is taken at right angles to the latter figure and in which the stopper or closure member is shown in the seated position.

Fig. 19 is a plan view showing a modified snap-in wire bail member similar to that shown in Fig. 17 but formed from a continuous piece of wire.

Similar reference characters refer to like parts throughout the various views.

Figure 7:
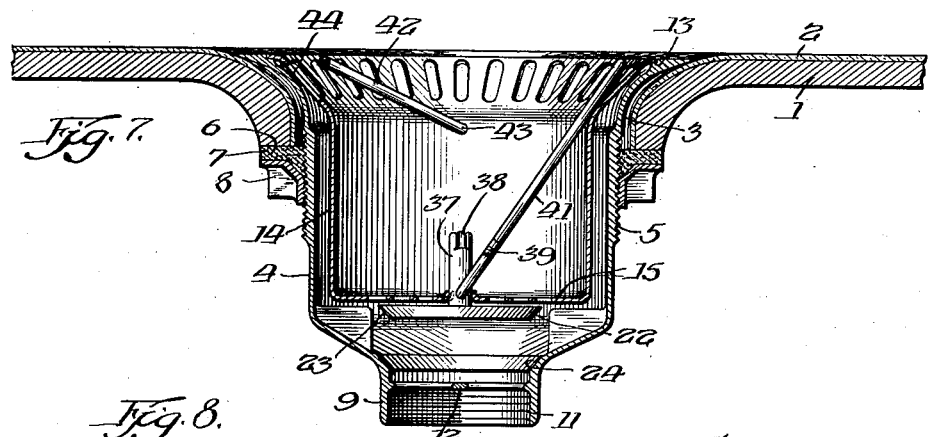
Fig. 7 is a sectional assembly view of a further modified form exemplifying our invention in which the strainer is provided with a snap-in type of bail member.

Referring to Fig. 1, the numeral 1 refers to a sink structure provided with the usual enamel coating 2 and having a drain opening 3 within which a conventional spud member 4 is applied, having one portion threaded as at 5, the lower portion of the sink at 6 having an abutting surface against which the gasket member 7 is positioned. A locking nut 8 is threadedly mounted upon the threads 5 of the spud member 4 in order to hold the latter in position within the sink drain opening 3 and also to make a watertight joint preventing leakage past the periphery of the spud member within the sink opening proper. The lower portion of the spud, as at 9, is preferably tapered and provided at its extreme lower portion with threads 11 by means of which the usual connection is made to a pipe and trap (not shown). A conventional spider 12 is used therein to prevent relatively large particles from dropping through and into the sink discharge trap (not shown).

Resting upon the peripheral shoulder 13 therewithin, a basket type of strainer 14 is mounted, the sides of which may be made solid, as indicated, or perforated, and the lower portion, as at 15, is preferably perforated to serve as a strainer. The strainer 14 at its center portion is provided with a hub 16 within which a valve member and pivotal lever 17 are reciprocably journaled, the handle preferably being of cylindrical form and having a T connection 18 at its upper end and pivotally attached, as at 19, to a complementary cylindrical form 21 journaled snugly within the hub 16 and preferably an integral part of the valve or stopper member 22, having a finished seat portion 23 for engagement with a similar surface or seat 24 upon the spud 4. Thus it will be apparent that by simply placing the lever 17 in a vertical position the stop end 25 may then be moved interiorly within the bearing of the hub 16 so that the lever member 17 is then in axial alignment with the lower portion 21. This will enable the entire valve structure and handle to be dropped by its own weight against the seat 24 and thus close the drain opening when desired.

It will be further apparent that upon gripping the T extension 18, the valve 22 may be lifted from the seat 24 and, if desired, the entire basket strainer 14 may be removed simultaneously with the closure member 22, or if it is desired to drain the water, then the handle may simply be lifted sufficiently so that the stopper 25 contacts as at 10, shown in Fig. 1, thereby holding the valve closure member in the open position.

It should be noted that at all times the end of the handle 17 is positioned sufficiently above the lower and interior portion of the basket type strainer so that it is unnecessary to have the fingers contact with the material accumulated within the strainer proper, and if desired further, the T handle 18 may be dispensed with entirely, in which case the basket type strainer may be slipped over the cylindrical portion of the handle 17 without disturbing the positioning of the valve 22.

Referring now to the modified form of construction shown in connection with Figs. 4 to 6 inclusive, in this type of structure the spud member 4 is similarly mounted in the manner described in connection with Fig. 1 but the basket type of strainer 14 is made slightly narrower in its diameter so as to permit a slot and crank mechanism journally mounted within the strainer as at 28. The handle 26 is journalled at its angular portions 27 within the strainer 14, as indicated, and at its exterior extension beyond the basket type of strainer it is provided with an offset portion 29 which engages, as at 31, the slot 32 of the sidewardly extending members 33 preferably integrally connected with the closure member 22, likewise having the seating surface 23 for seating within the spud 4, as at 24.

Thus it will be apparent, as more clearly shown in Fig. 6, that by rotative movement of the handle 26 to the left, the offset member 31 will be arcuately moved correspondingly so as to lift the extending members 33 by virtue of the engagement of the members 31 with the slot 32. Further, in order to insure the movement of the valve stopper 22 vertically upward, the guides 34 are provided which engage the grooves 35 of the screen 14. It will further be apparent that because of the extension member or post 36 upon the closure member 22, the user will be enabled to observe the relative position of the stopper or closure member 22, that is, whether the latter is in open or closed position.

Figure 8:
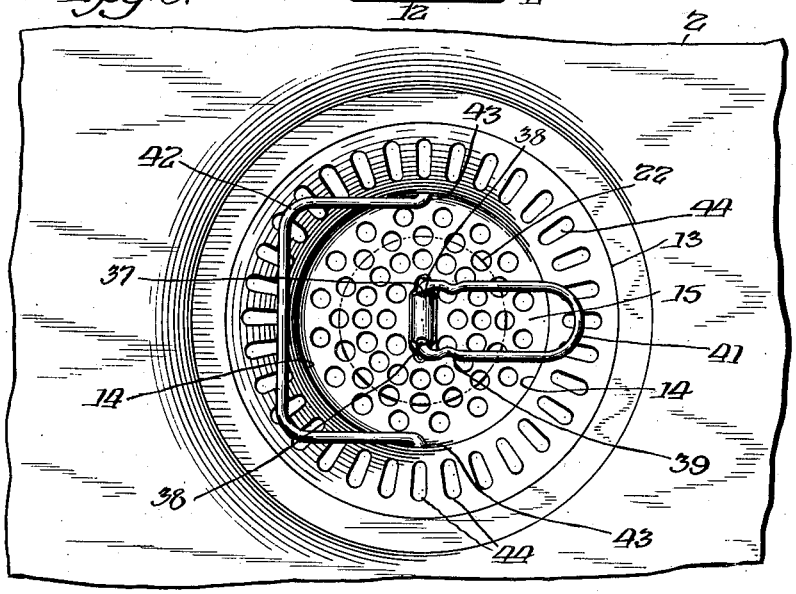
Fig. 8 is a plan view of the construction described in connection with Fig. 7.
Figure 9:
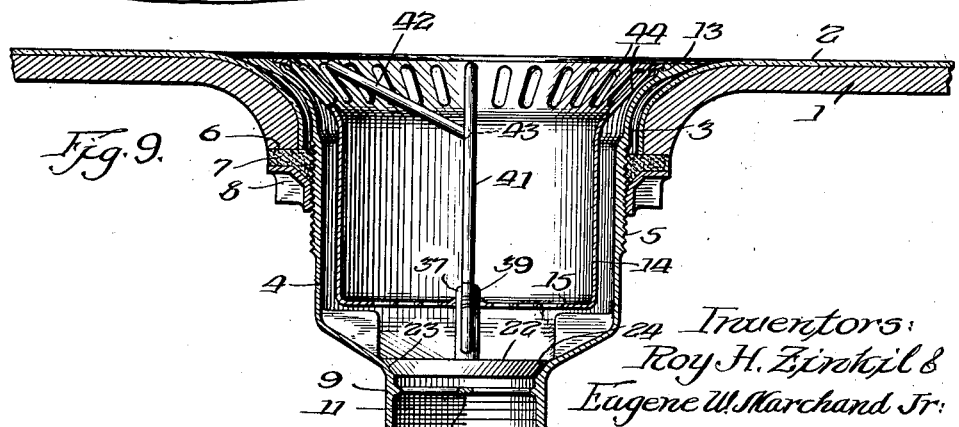
Fig. 9 is a view similar to that described in connection with Fig. 7.

Referring now to the further modified form shown in Figs. 7 to 9 inclusive, here too the spud member 4 is applied to the sink in a manner similar to that described in connection with Figs. 1 to 6 inclusive, but in this form of construction the stopper 22 is supplied with an upwardly extending post member or extension 37 having short grooves 38 for the purpose of engaging a depressed portion 39 of the handle 41. In addition, the strainer is supplied with an auxiliary handle 42 pivoting, as at 43, within the strainer 14. In this construction the handle 41 tilted to one side as shown in Fig. 7 will hold the closure member 22 in an open position, as indicated, and when moved to a vertical position, engaging the grooves 38 and pressed downward past the depressed portion of the handle 41, will permit the stopper or closure member to contact, as at 24, similar to that described in the previously referred to figures. In this form of construction it may be convenient to provide the strainer with the openings 44, although this is not an essential part of our invention and may therefore be dispensed with, as desired.

Thus in this construction it will be evident that when it is necessary to remove the strainer and the valve closure member or stopper 22, the handle 41 may be moved to a vertical position so that the recessed portion 39 engages the grooves 38 thereby maintaining the stopper handle 41 in a vertical position, so that by grasping the strainer handle 42 the latter structure may be lifted or removed independently. It will be further apparent that with the stopper handle 41 shown in the inclined position of Fig. 7 both the strainer 14 and the stopper 22 may be removed together upon grasping the strainer handle 42 and then lifting upwardly.

Figure 10:
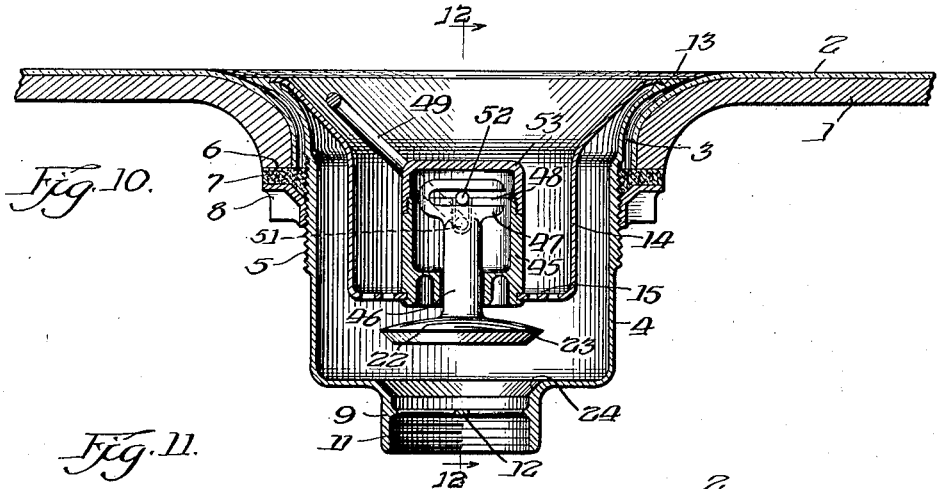
Fig. 10 is a further modified form exemplifying our invention in which the stopper is likewise carried by the basket type strainer and in which a slot and crank mechanism fulcruming on the centerpiece or strainer is used.
Figure 11:
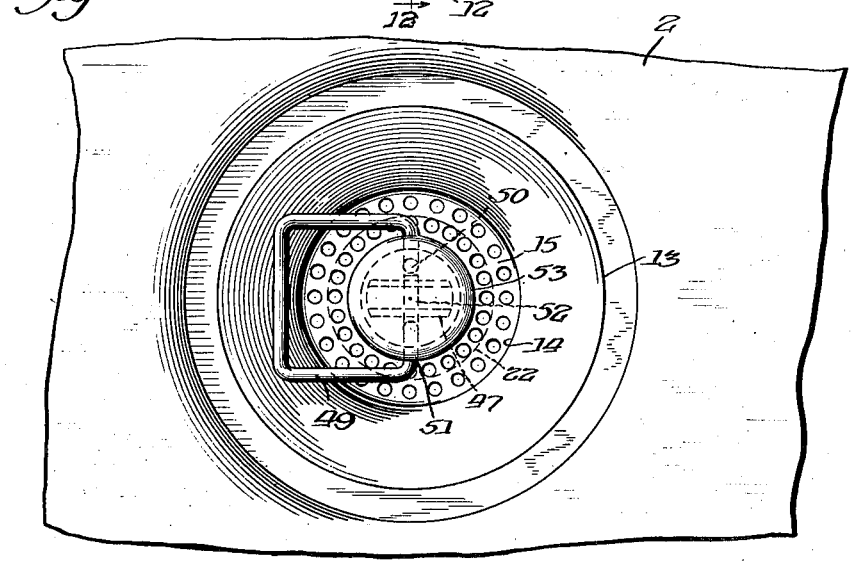
Fig. 11 is a plan view of the construction described in connection with Fig. 10.
Figure 12:
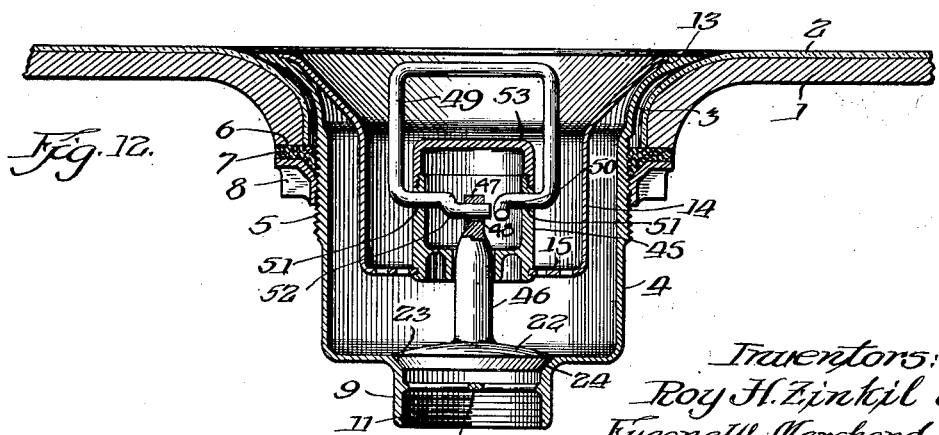
Fig. 12 is a sectional view taken on the line 12—12 of Fig. 10.

Referring now to the further modified form shown in Figs. 10 to 12 inclusive, here likewise the spud member 4 is applied to the sink 1 in a manner similar to that described in connection with the previous figures, but the strainer 14 seating within the spud 4 is provided with a central hollow boss 45 within which the guide member or extension 46 of the valve closure member 22 is reciprocably journaled. The guide member 46 at its upper portion has a slotted part 47, as indicated at 48. A handle 49 is journaled within the central hollow boss as at 51, the handle 49 being provided with an offset portion 52 whereby upon rotation of the handle 49 in an arcuate manner the offset portion moves within the slot 48, but as distinguished from Figs. 4 to 6 inclusive, it will be noted that the handle proper is mounted completely within the hollow boss rather than within the strainer. The advantage of this construction lies in having a more sturdy arrangement insofar as durability is concerned, and also enables quick removal for purpose of repair and inspection by means of the threaded cap 53.

Referring to Figs. 13 to 15 inclusive, a still further modified exemplification of our invention is illustrated in which the application to the sink is identical to that described in connection with the previous figures but in which the handle member 26, journaled within the strainer 14 as at 28 and having the offset portion 27, is connected to a bail member 33 and connected by means of the clasps 54 to the closure member 22, the bail member having an offset portion 55 encircling the guide member 36 of the closure 22. Here similarly the movement of the handle 26 in an arcuate form allows for the reciprocable movement of the closure to open and closed positions.

As to Figs. 16 to 18 inclusive, a more economical and preferred construction is shown in which a simple single wire handle 56, having journaling projections 57 extending within the bearing 58 in the post 59, provides a convenient means for raising the stopper 22 from its seat 24 and locking the stopper in the raised or open position, the locking being accomplished by tilting the handle 56 to one side causing the ends 62 to project over the periphery of the aperture 63 and bear against the upper surface of the perforated portion 15 of the strainer 14. The lug 59 is provided with the preferably integral guide ribs 61 which prevent rotative movement of the closure parts with respect to the strainer 14.

In Fig. 19 the handle 56 is modified still further being formed from a continuous piece of wire in which the ends 62 as shown in Figs. 16, 17 and 18 are replaced by the bent portions 62a. The journaling projections 57 in the last named figures are replaced by the journaling ends 57a extending into the bearing 58a in the lug 59a. The manner of operation of the modified form herein described is identical to that described in connection with Figs. 16 to 18 inclusive.

Having thus described our invention what we claim and desire to secure by Letters Patent is:

1. In a sink strainer and stopper including a hollow spud member and a cupped strainer adapted to be positioned within the drain opening of a sink or the like, a reciprocably operable plug for the said drain opening, the said hollow spud member providing a seat for the said plug, a pivotable operating handle engageable with the said plug, the said handle being formed integrally of a wire-like material, one end portion thereof being shaped for suitable manipulation of the said handle during pivotal movement, the opposite end of the handle having spaced apart offset portions journaled within the said plug.

2. In a combined sink strainer and plug arrangement, a hollow spud member secured within the drain opening of a sink or the like and providing a seat for the said plug, a cupped strainer adapted to be removably positioned within the said spud member, a pivotable handle therefor, the said plug being positioned below the said strainer and reciprocably operable by the said pivotable handle extending through a suitably formed aperture in the base portion of the said strainer, the said plug having an extension movable within the said aperture of the strainer, the said extension having means for retaining the said handle in a position whereby a portion of the handle may be admitted within the aperture during reciprocal movement of the plug in its open and closed positions.

3. In a strainer and plug combination of the character described, a hollow spud member secured within the drain opening of a sink or the like and providing a seat for the said plug, a strainer adapted to be removably positioned within the said spud member, a pivotable handle therefor of substantially U-form and having oppositely disposed spaced apart end portions journally engaging the said plug, the said plug being positioned below the said strainer and being reciprocably operable by the said pivotable handle, the said plug having extension means passable through a suitably formed aperture in the base portion of the said strainer, the said handle being entirely passable through the aperture of the said strainer when the latter member is removed from the said spud member.

4. In a combined sink strainer and plug arrangement, a hollow spud member secured within the drain opening of a sink or the like and providing a seat for the said plug, a hollow strainer adapted to be removably positioned within the said spud member, a pivotable handle having spaced apart projections for journalled engagement with the said plug, the latter member being positioned below the said strainer and being reciprocably operable by the said pivotable handle, the said strainer having an aperture in the base portion thereof, the said plug having an extended portion suitably formed so as to be axially movable within the said strainer aperture, the said handle being axially movable within extended end portions of the strainer aperture whereby the said handle together with the said extended portion of the plug are simultaneously passable within the said strainer aperture during reciprocable movement of the plug.

5. In a sink strainer and stopper including a hollow spud member and a strainer adapted to be positioned within the drain opening of a sink or the like, a reciprocably movable plug for the said drain opening, the said hollow spud member providing a seat for the said plug, a pivotably movable handle for the said plug, the closed end portion of the said handle being formed to provide convenient gripping means for actuation thereof, the other end portion of the handle having oppositely disposed spaced apart projections journally engaging the upper portion of the said plug, the said latter end portion of the handle also having integral offset means engageable with an upper surface of the bottom portion of the said strainer while maintaining the plug in open position.

6. In a sink strainer and stopper including a hollow spud member and a cupped strainer adapted to be positioned within the drain opening of a sink or the like, a reciprocably operable plug for the said drain opening, the said hollow spud member providing a seat for the said plug, a pivotably movable handle of wire-like material for the said plug, one end portion of the said handle being formed to provide a convenient holding means therefor, the other end portion of the handle being crimped to form respectively inwardly extending spaced apart projections journally engaging the upper portion of the said plug and offset angular means engageable with the upper surface of the bottom portion of the said strainer for maintaining the plug in open position.

ROY H. ZINKIL.
EUGENE W. MARCHAND, JR.